United States Patent [19]

Burton

[11] 4,383,091

[45] May 10, 1983

[54] URETHANE MODIFIED POLYMERS HAVING HYDROXYL GROUPS

[75] Inventor: Bruce L. Burton, Lake Jackson, Tex.

[73] Assignee: The Dow Chemical Company, Midland, Mich.

[21] Appl. No.: 394,393

[22] Filed: Jul. 1, 1982

Related U.S. Application Data

[63] Continuation-in-part of Ser. No. 188,810, Sep. 19, 1980, Pat. No. 4,338,242.

[51] Int. Cl.$^3$ ............................................. C08L 63/10
[52] U.S. Cl. .................................... 525/528; 523/436; 523/466; 523/522; 523/527; 525/28; 525/454; 525/922; 528/69
[58] Field of Search ................... 528/69; 525/28, 454, 525/528, 922

[56] References Cited

U.S. PATENT DOCUMENTS

| | | | |
|---|---|---|---|
| 2,503,209 | 4/1950 | Nyquist | 525/28 |
| 2,958,704 | 11/1960 | Dinsberg | 528/69 |
| 3,118,922 | 1/1964 | Hartung | 538/69 |
| 3,373,221 | 5/1968 | May | 525/528 |
| 3,471,449 | 10/1969 | Heydlkamp | 528/69 |
| 3,478,126 | 11/1969 | Turpin | 525/528 |
| 3,509,234 | 4/1970 | Burlant | 525/455 |
| 3,664,861 | 5/1972 | Okamura | 117/93.31 |
| 3,713,864 | 1/1973 | Ackerman | 117/38 |
| 3,776,889 | 12/1973 | Pande | 528/69 |
| 3,871,908 | 3/1975 | Spoor | 525/455 |
| 4,004,997 | 1/1977 | Tsukamoto | 528/69 |
| 4,035,523 | 7/1977 | Pampouchidis | 525/528 |
| 4,162,274 | 7/1979 | Rosenkranz | 528/69 |
| 4,221,686 | 9/1980 | Sakiyama | 525/528 |
| 4,233,425 | 11/1980 | Tefertiller | 528/69 |
| 4,239,866 | 12/1980 | Reitel | 525/455 |

*Primary Examiner*—Paul Lieberman

[57] ABSTRACT

Curable polymeric products are the reaction product of a polymer containing secondary hydroxyl groups and an aliphatic unsaturated isocyanate.

5 Claims, No Drawings

URETHANE MODIFIED POLYMERS HAVING HYDROXYL GROUPS

CROSS-REFERENCE TO RELATED APPLICATIONS

This application is a continuation-in-part of U.S. Ser. No. 188,810, filed Sep. 19, 1980 now U.S. Pat. No. 4,338,242.

BACKGROUND OF THE INVENTION

In many resin applications, low viscosity and good physical properties after a minimal heat cure are necessary. Frequently, however, those objectives are antithetical. Certain polymer systems that are based on a polyglycidyl ether, such as the vinyl ester resins, have hydroxyl groups along the molecular structure. Those hydroxyl groups cause an appreciable increase in viscosity which requires extensive dilution with a monomer to permit facile fabrication.

It would be desirable to have a procedure for reducing the viscosity of hydroxyl containing polymers while at least retaining the properties of the polymer when cured.

SUMMARY OF THE INVENTION

A curable resin having improved physical and chemical properties results from the reaction of an amine-free vinyl ester of a polyglycidyl ether having secondary hydroxyl groups and an unsaturated isocyanate reacted through those hydroxyls. The resin resulting from that process has a lower viscosity than the corresponding unmodified resin. In the cured state, the increased cross-linking density provides improved heat distortion temperatures and hardness and a decrease in water and solvent sorption.

DETAILED DESCRIPTION OF THE INVENTION

Bowen in U.S. Pat. Nos. 3,066,112 and 3,179,623 describes the preparation of vinyl ester resins by esterifying acrylic or methacrylic acid with a polyepoxide. That patentee also describes the alternate procedure wherein a glycidyl acrylate or methacrylate is reacted with the sodium salt of bisphenols. Vinyl ester resins based upon epoxy novolacs are taught in U.S. Pat. No. 3,301,743.

For use herein, the vinyl ester resin can be prepared from any glycidyl polyether. Useful glycidyl ethers are those of polyhydric alcohols and phenols. Such glycidyl polyethers are commercially available or are readily prepared by reacting at least two moles of an epihalohydrin or glycerol dihalohydrin with one mole of the polyhydric alcohol or phenol together with a sufficient amount of caustic to react with the halogen of the halohydrin. The products are characterized by the presence of more than one glycidyl ether group per molecule.

The useful acids for making the vinyl ester resins are those ethylenically unsaturated monocarboxylic acids such as acrylic, methacrylic, cinnamic acids and their halogenated isomers. Also included are the hydroxyalkyl acrylate or methacrylate half esters of dicarboxylic acids as described in U.S. Pat. No. 3,367,992 wherein the hydroxyalkyl group preferably contains from 2 to 6 carbon atoms.

The glycidyl ether and the acid are reacted in about stoichiometric equivalency generally with heating in the presence of a catalyst, such as a trivalent chromium salt, as, for example, chromium trichloride. Vinyl polymerization inhibitors are also commonly included to prevent premature polymerization. For purposes of this invention, amines are contraindicated for this esterification reaction.

The isocyanate should preferably be aliphatic to achieve the optimum benefits of the invention. Typical of those isocyanates are those of saturated or unsaturated esters of acrylic or methacrylic acid, allyl ether isocyanate, vinyl isocyanate, unsaturated or saturated aliphatic isocyanates and blends or mixtures of any of those isocyanates. A preferred species is isocyanatoethyl methacrylate.

Since the vinyl ester resin is unsaturated, the isocyanate may be saturated, unsaturated or a combination thereof.

The isocyanate is employed in an amount of 0.05 to 1.00 equivalent per equivalent of hydroxyl. Less than about 0.05 equivalent imparts little observable change in the cured product. Any isocyanate in excess of 1.0 equivalent has no place to react and thus could detract from the desired properties of the cured product.

The reaction of the isocyanate with the secondary hydroxyl is conducted using known techniques. In a typical reaction, the amine-free vinyl ester resin, the reactive diluent and a catalyst, such as stannous octoate, are thoroughly mixed together and brought to a mildly elevated temperature of, for example, 50° C. The isocyanate is slowly added with stirring. Heating is maintained until absence of the isocyanate band in the infrared spectrum is attained which indicates the reaction to be complete. When the vinyl ester resin is prepared using an amine catalyst and a tin catalyst is used with the subsequent isocyanate reaction, the resulting product shows little viscosity reduction. When trivalent chromium is employed in the esterification reaction and is followed by the use of tin catalysts in the isocyanate reaction, the result is a reaction product having reduced viscosity and improved physical and chemical properties.

The potential for cross-linking in the isocyanato product can be adjusted in several ways. The amount of unsaturation in the polymer or precursor can be varied. The number of hydroxyls in that starting material can vary. The amount of unsaturated isocyanate can be adjusted to that providing the desired number of cross-links. Some of the hydroxyls can be reacted with a saturated aliphatic isocyanate.

It is commonplace in the vinyl ester resin art to adjust the viscosity of the liquid uncured resin with a reactive diluent, usually a copolymerizable monomer. Suitable monomers for this use include vinyl aromatic monomers, such as styrene and vinyltoluene, and acrylate or methacrylate esters of lower alkanols. The reactive diluent may be an amount of up to 60 weight percent of the combined resin/monomer weight.

The products have improved properties, particularly heat distortion temperature, hardness and low solvent sorption. The products find use as neat resins and in reinforced plastics. Of particular note are their use in fiberglass reinforced filament wound pipe, electrical laminates, electrical insulating varnishes and coatings, bulk and sheet molding compounds, and corrosion resistant vessels and linings for vessels.

The concept of the invention will be more apparent from the following illustrative examples wherein all parts and percentages are by weight.

EXAMPLE 1

A vinyl ester resin was made as follows. To a 1-liter resin kettle equipped with a stirrer, thermometer, temperature controller and heat lamp, were charged 495 grams tris(4-glycidylphenyl)methane (3 equivalents); 0.3 gram hydroquinone (400 ppm); and 258 grams methacrylic acid (3 equivalents). After mixing thoroughly at 80° C., 0.75 gram of a 25 percent chromium acetate solution in methanol was blended in and the temperature set to 100° C. After 20 minutes, the temperature was set to 110° C. and upon controlling for a short time to check any exotherm, the temperature was raised to 115° C. The reaction was run at this temperature until the percent acid decreased below one percent.

One hundred parts of the trimethacrylate of tris(4-glycidylphenyl)methane prepared above, 25 parts of styrene and 0.1 part stannous octoate were mixed while heating to 50° C. To that mix while stirred was slowly added 47.02 parts isocyanatoethyl methacrylate (IEM) and the temperature raised to 60° C. Heating and stirring were continued until the absence of the isocyanate band in the IR spectrum at 2280 cm$^{-1}$ indicated the reaction to be complete.

To the product was added 11.75 grams styrene. The resin was cured with 1.5 parts benzoyl peroxide per 100 parts resin at a temperature schedule of 2 hours at 90° C., 4 hours at 165° C. and 16 hours at 200° C.

For comparison, the trimethacrylate with 20 percent styrene was cured in an identical manner. The samples were tested according to standard methods with the following results.

|  | Nonmodified | IEM Modified |
| --- | --- | --- |
| Viscosity* (cstks) | 11,510 | 7,565 |
| HDT °C. 264, psi | >230 | >230 |
| $T_g$ | 245 | 266 |
| Flex. Mod., psi | 9.38 × 10$^5$ | 8.03 × 10$^5$ |
| Flex. Strength, psi | 17,470 | 9,466 |
| Barcol Hardness | 41 | 53 |
| Gardner Color | 17 | 17 |

*Before cure

Other samples of the above-described resins were cured with 1.5 parts benzoyl peroxide at 2 hours at 90° C. and 4 hours at 165° C. The heat distortion temperature of the nonmodified resin was 203° C. and of the IEM modified resin was greater than 230° C. The Barcol Hardness of the former was 42 and of the latter was 50.

EXAMPLE 2

A resin was prepared according to the procedure and stoichiometry of Example 1 using a commercially available dimethacrylate of the diglycidyl ether of bisphenol A (sold as DERAKANE ® 411-45) as the polymer and vinyltoluene as the reactive diluent.

The resin was cured with 1.5 parts benzoyl peroxide per 100 parts of resin for one-half hour at 150° C. The samples were tested according to standard procedures with the following results.

|  | Nonmodified | IEM Modified |
| --- | --- | --- |
| Viscosity (cstks) | >1,646 | 1,445 |
| HDT °C. 264, psi | 110 | 137 |
| Flex. Mod., psi | 4.99 × 10$^5$ | 5.29 × 10$^5$ |
| Flex. Strength, psi | 21,510 | 17,240 |
| Tensile Strength, psi | 9,100 | 6,460 |
| 24 Hr. H$_2$O Boil, % Δ wt$^2$. | 1.827 | 1.758 |
| Barcol Hardness | 45 | 49 |
| Gardner Color | >1 | 1 |

Similar results were observed when the vinyl ester resin was an amine-free resin prepared from a blend of 3 parts methacrylated ester of the polyglycidyl ether of a novolac having a functionality of 3.5 and 1 part of a dimethacrylate of the diglycidyl ether of bisphenol A. The viscosity of the unmodified resin was 4120 cks and of the isocyanatoethyl methacrylate modified product was 3888 cks.

Also, similar property improvements were observed when the curing system was 1.5 parts methyl ethyl ketone peroxide and 0.5 part cobalt naphthenate.

When vinyl ester resins that had been made using tris(dimethylaminomethyl)phenol as the esterification catalyst were used, there was no significant reduction in viscosity.

What is claimed is:

1. A process for preparing vinyl ester resins having reduced viscosities, said process comprising the reaction of at least 50 percent of the secondary hydroxyls of an amine-free vinyl ester of a polyglycidyl ether with isocyanatoethylmethacrylate using a tin salt as catalyst.
2. The process of claim 1 wherein said polyglycidyl ether is the diglycidyl ether of bisphenol A.
3. The process of claim 1 wherein said polyglycidyl ether is an epoxy novolac.
4. The process of claim 3 wherein said polyglycidyl ether is a blend of an epoxy novolac and a diglycidyl ether of bisphenol A.
5. The process of claim 1 wherein the esterification of said polyglycidyl ether with an unsaturated acid used trivalent chromium as esterification catalyst.

* * * * *